INVENTOR
L. E. GALLAHER
BY
ATTORNEY 3,439,340

SEQUENTIAL ACCESS MEMORY SYSTEM

Lee E. Gallaher, Middletown, N.J., assignor to Bell Telephone Laboratories, Incorporated, New York, N.Y., a corporation of New York Filed July 30, 1965, Ser. No. 476,039

Int. Cl. G11b *13/00*

U.S. Cl. 340—172.5 10 Claims

ABSTRACT OF THE DISCLOSURE

The information transfer rate of a sequential access memory system is increased by queueing random address, information transfer requests in the serial manner in which addresses in the sequential memory system occur, such that a group of requests may be processed during a single memory period. While one group of queued requests is being processed, another group is queued for subsequent processing, thereby providing an endless queue of data transfer requests.

This invention relates to sequential access memory systems and more particularly to a method and arrangement for increasing the information transfer rate of sequential access memory systems.

Memory systems are divided generally into two classes according to the type of access that may be had thereto for transferring information into or out of the memory. The time required for transferring an item of information into a selected memory location or for transferring an item of information out of a selected memory location is generally referred to as the access time, or information transfer rate, of the memory system. Random access memory systems, such as those employing magnetic core or storage tube memories, afford access selectively to any location in the store for information readout or for information storage, and thus the information transfer rate theref is independent of memory location. Sequential access memory systems, on the other hand, such as magnetic drum or megnetic disc systems, have an information transfer rate dependent upon the memory location, affording access to the memory locations on a one-after-the-other basis in a fixed memory location pattern.

Memory units for sequential access memory systems tend to provide considerably greater storage capacity at less cost than their random access memory system counterparts, and they have thus found particularly advantageous application in inventory data processing systems, such as those for maintaining a running account of items in stock or of customer accommodations available. Similarly, sequential access memory systems find advantageous application in other types of storage and retrieval systems wherein large numbers of independent items of information are received and stored for subsequent retrieval. However, in these and other applications the information transfer requests made on the memory system generally occur for random memory locations or addresses, thus bringing into consideration the speed or rate at which the individual transfer requests can be processed by the system. Normally, a sequential access memory system is limited to processing an average of two or fewer random address information transfer requests during a memory period, where a memory period is the time between two consecutive accesses of the same memory location. For example, the memory period of a magnetic drum or disc memory having an individual transducer head for each information storage track is the time required for one complete revolution of the drum or disc.

In many applications an information transfer rate of an average of only two or fewer items of information per memory period has been found to be inadequate and a considerable disadvantage. Accordingly, various approaches have been devised in the art for increasing the information transfer rate of sequential access memory systems. It is known, for example, to employ a plurality of access circuits, such as a plurality of transducer heads positioned along each information storage track of the memory, or to employ a plurality of shorter period memories operating in parallel rather than a single long period memory. These arrangements, however, suffer from a concomitant increase in cost, bulk and circuit complexity, detracting from the advantages in using a sequential access memory.

Other known memory arrangements have sought to increase the effective information transfer rate of the system by increasing the operating speed of the memory. This tends, however, to decrease the reliability of the system and to increase the cost, circuit complexity and power requirements of the memory system, particularly in the case of a magnetic drum or disc.

It is accordingly a general object of this invention to provide a new and improved method and arrangement for increasing the information transfer rate of sequential access memory systems.

More particularly, it is an object of this invention to increase the information transfer rate of sequential access memory systems by a method which is simple and economical and which overcomes the disadvantages and shortcomings of known arrangements.

A further object of this invention is to provide a simple and economical method and arrangement for increasing the rate at which random address information is transferable into and out of a sequential access memory system, without increasing the system operating speed and without requiring multiple memories or multiple access circuitry for a memory channel.

In accordance with a feature of my invention, the above and other objects are attained in a simple and economical manner by queueing, or ordering, groups of random address information transfer requests in the serial manner in which the addresses occur in the sequential access memory system, such that entire groups of transfer requests can be processed during, for example, a single memory period. Normally heretofore, the information transfer requests have been accumulated for processing in a work list in the consecutive order received. Each new information transfer request was added to one end of the list and processed in its turn, processing proceeding on a sequential basis from the other end of the transfer request work list. I have found, however, that the information transfer rate is increased substantially by considering the transfer requests in the work list a group at a time rather than singly, ordering the individual transfer requests in the group for processing in the same serial manner as the addresses or memory locations in the sequential access memory system.

While the system is processing a first group of information transfer requests so ordered, a second group of transfer requests may be ordered for subsequent processing, the first transfer request of the second group following immediately behind the last transfer request of the first group. Repeating this ordering of the transfer requests by groups thus transforms the randomly oriented work list, in effect, into an endless queue of requests. This provides an information transfer rate for the sequential access memory system which may approach the number of items of information contained in a memory period, the information transfer rate depending principally upon the number of accumulated transfer requests considered in each group from the work list.

For certain applications of sequential access memory systems it is not feasible to obtain access to adjacent sequential address in the memory. This may occur, for example, due to the time required to read an information transfer request and to initiate processing thereof, or due to the time required for switching between individual access circuits in a multiple channel memory system and for any switching transients to subside before information transfer can be effected. In accordance with another feature of my invention, therefore, the information transfer requests are individually ordered into predetermined memory address groups, such as memory sector address groups or even and odd address groups. Thus, in the latter instance, the information transfer requests may be ordered alternately into even numbered address groups and into odd numbered address groups, an even address group of transfer requests to be processed during one memory period and an odd address group of transfer requests to be processed during the next memory period. This method of queueing the information transfer requests is particularly advantageous in memory systems wherein the individual word locations of adjacent memory addresses are interleaved within each memory channel.

Another aspect of the present method for increasing the information transfer rate of sequential access memory systems, in accordance with an alternative illustrative embodiment thereof, relates to the provision of circuitry for ordering the individual information transfer requests as they are received. A memory period may be divided advantageously into a plurality of memory storage sectors each including one or more memory addresses; and a like plurality of information transfer request lists may be employed, each of which is respectively associated with a corresponding one of the memory storage sectors. When an information transfer request is received, therefore, it is placed in the particular list associated with the storage sector to which the information transfer request is directed. Each of the lists thus comprises a series of information transfer requests with respect to a particular memory storage sector associated therewith, new transfer requests being added to one end of the appropriate work list as received. Accordingly, the first information transfer requests in each of the plurality of work lists form a first queue ordered for processing in the manner described above, the second information transfer requests form a second queue ordered for processing, and so on.

This arrangement is particularly advantageous in memory systems wherein information to be stored in the memory is assigned to a particular storage location by the memory system rather than it being preassigned. In such systems, reference to the plurality of information transfer request lists readily shows which memory storage locations have the least backlog of transfer requests. This permits better distribution of the work load by assigning the new transfer requests to those locations whenever possible.

These and other objects and features of the invention may be fully apprehended from the following detailed description when considered with reference to the accompanying drawing in which:

FIGS. 1 and 2 comprise a block diagram of an illustrative embodiment of an arrangement in a sequential access memory system for performing the method of the present invention;

Figure 1:
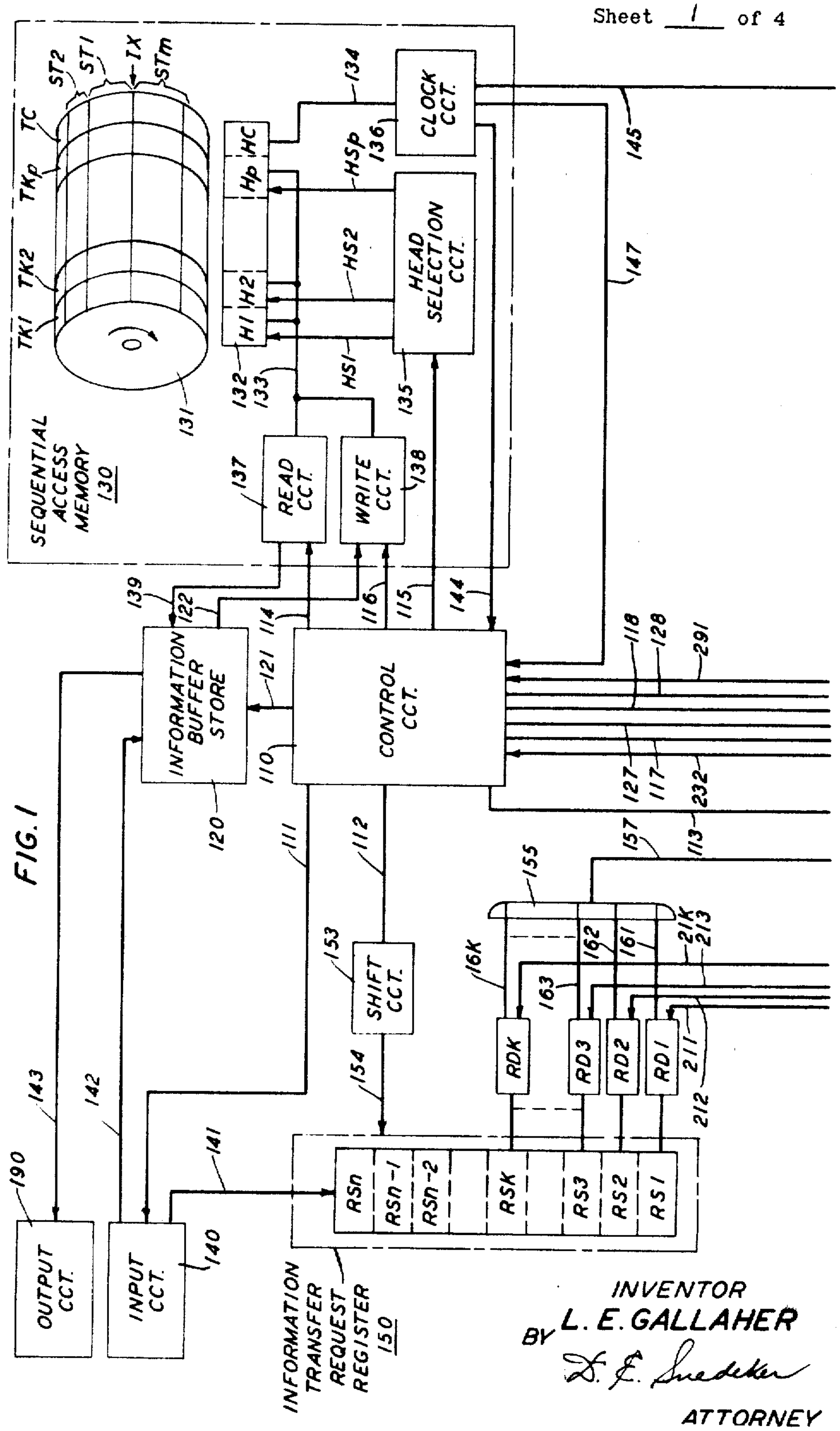
Figure 2:
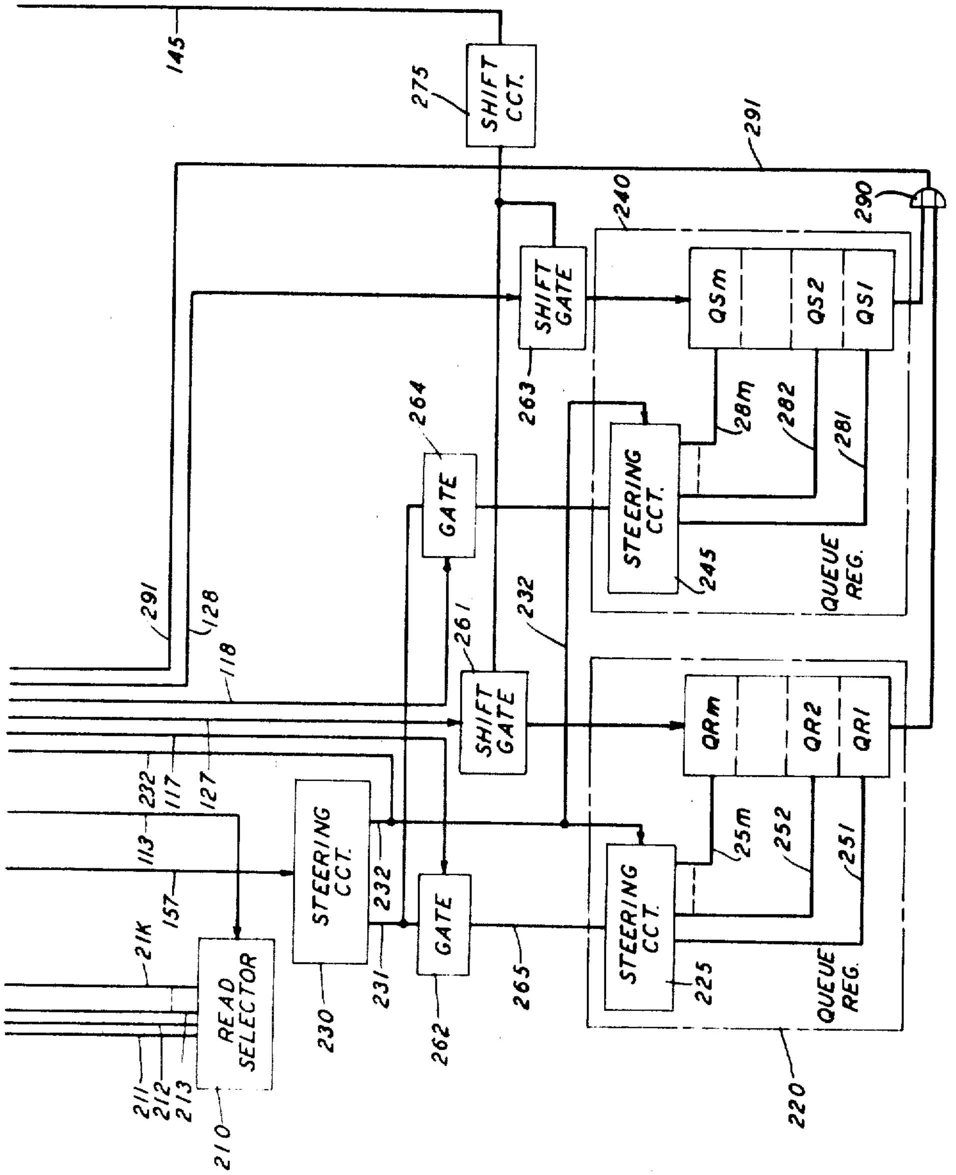

For purposes of description, the illustrative embodiment of the present invention shown in FIGS. 1 and 2 of the drawing is depicted in a sequential access memory system employing a magnetic drum memory. Thus sequential access memory 130 comprises magnetic drum 131 and its associated circuitry including read-write heads 132, head selection circuit 135, clock circuit 136, read circuit 137 and write circuit 138. It will be apparent from the description below, however, that the present invention may be employed readily in connection with other known sequential access memories, such as magnetic disc or delay line memories, to increase the information transfer rate of the sequential access memory system. Of course, it will be appreciated that the arrangement of the memory, in the case of multiple memory channels such as multiple drum or disc tracks or multiple delay lines, must be such that a fixed relationship exists between the information storage locations in the several channels.

Figure 3:
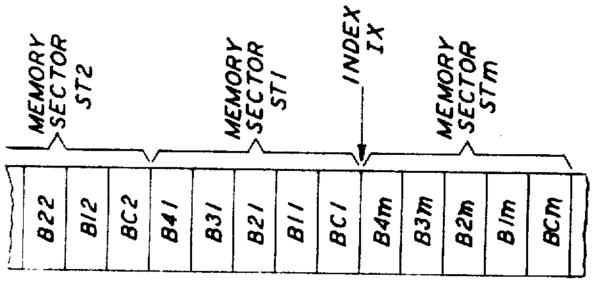
FIG. 3 illustrates a typical memory information storage pattern.

Magnetic drum 131 in sequential access memory 130 comprises a plurality of parallel information storage tracks TK1 through TK$p$ and one or more timing tracks TC. Information storage tracks TK1 through TK$p$ may be divided typically into a number of memory sectors ST1 through ST$m$, each sector comprising a plurality of serially arranged memory locations or storage blocks for the storage of information. For example, as shown in FIG. 3, each memory sector of a storage track may comprise four storage blocks, such as blocks B11 through B41 of memory sector ST1, each storage block comprising one or more words of information serially arranged along the storage track. Each memory sector typically further comprises a control block, such as block BC1 in memory sector ST1, to provide for various control functions. Index IX is an arbitrarily chosen reference point defining the beginning of each new memory cycle or period for each of the memory storage tracks.

Read-write heads 132 comprises a plurality of heads H1 through H$p$ individually associated with respective ones of information storage tracks TK1 through TK$p$. A particular one of heads H1 through H$p$ is selected in known manner for transferring information to or from its associated storage track by head selection circuit 135 under control of control circuit 110. A particular head H1 through H$p$ is selected by head selection circuit 135, for example, via a selection potential placed on the individual one of selection leads HS1 through HS$p$ connected to the particular head. Control circuit 110 may comprise wired logic for performing the various control functions described herein or, advantageously, it may comprise a program control of the type employed, for example, in general purpose data processing equipment.

Read-write heads H1 through H$p$ are connected in common over information lead 133 to read circuit 137 for transfer of information from the memory and to write circuit 138 for transfer of information into memory storage. Read circuit 137 and write circuit 138 are selectively enabled to perform their respective functions by control circuit 110 over leads 114 and 116, respectively. Timing information, obtained for example in the usual manner from timing tracks TC by clock transducer HC, is extended over lead 134 to clock circuit 136. Responsive thereto, clock circuit 136 provides timing signals on clock lead 144 associated with the bit and word storage locations of tracks TK1 through TK$p$, on clock lead 145 associated with the memory sectors, and once each revolution on index lead 147 associated with index IX.

Information to be transferred into sequential access memory 130 is provided to write circuit 138 over lead 122 from information buffer store 120. Information buffer store 120 comprises a small, random access memory of any suitable known construction. Information to be transferred out of sequential access memory 130 appears on lead 139 from read circuit 137 which may be connected, as shown in FIG. 1, to information buffer store 120. The output of information buffer store 120 is connected over lead 143 to output circuit 190. Each transfer of information into or out of sequential access memory 130 is initiated by an information transfer request from input circuit 140. The information transfer request comprises the particular address location on magnetic drum 131 at which the transfer of information into or out of storage is to be executed, a read-write instruction, and the address in information buffer store 120 at which the information is stored awaiting execution of the transfer request, or to which the information is to be transferred in the case of a transfer of information out of sequential access memory 130.

In many applications for which sequential access memory systems are particularly well suited, successive information transfer requests occur with respect to random address storage locations in memory 130. The transfer requests are normally accumulated for processing in a "push-down" work list in the consecutive order received. Each new information transfer request is added to one end of the work list and processed in its turn, processing proceeding from the other end of the work list on a sequential basis. Assuming the use of a single read-write head for each memory storage track as shown in FIG. 1, the information transfer rate of the sequential access memory system is thus limited to an average of two or fewer random address information transfer requests during each revolution of drum 131. I have found, however, that the information transfer rate is increased substantially by considering the transfer requests in the work list a group at a time rather than singly, ordering the individual transfer requests in the group for processing in the same serial manner as the addresses of the storage locations in the sequential access memory. In accordance with the method of the present invention, therefore, the randomly oriented information transfer requests are transformed, in effect, into an endless queue of requests providing an information transfer rate approaching the number of storage locations contained in a memory period, that is, approaching the number of storage locations in a storage track of drum 131.

In the illustrative arrangement for performing the method of the present invention shown in FIGS. 1 and 2, an information transfer request register 150 is provided, comprising a plurality of register stages RS1 through RS*n* for receiving successive information transfer requests over request lead 141 from input circuit 140. Each register stage in information transfer request register 150 is of sufficient capacity to register an individual information transfer request which, as mentioned above, comprises a sequential access memory address, an information buffer store address, and a read-write instruction.

The assignment of an address in information buffer store 120, at which the information is stored awaiting execution of the corresponding transfer request or to which the information is to be transferred in the case of a transfer of information out of memory 130 is made by control circuit 110 over lead 111. Thus in the case of a request for transfer of information into memory 130, for example, control circuit 110 via lead 111 assigns to the transfer request an empty storage location in information buffer store 120 for storage of the information associated with the request until the request can be executed. The information is then directed over information lead 142 to the assigned storage location in information buffer store 120 under control of control circuit 110; and the corresponding transfer request, inclusive of the assigned information buffer store location, is directed over request lead 141 to information transfer request register 150.

The information transfer requests are accumulated in information transfer request register 150 in the consecutive order received, the first request being registered in register stage RS1, the second request being registered in register stage RS2, and so forth, each successive transfer request being registered in the bottom-most vacant register stage of request register 150. A number of the request register stages, namely register stages RS1 through RS*k*, are individually connected to respective read circuits RD1 through RD*k* associated therewith. Read circuits RD1 through RD*k* may be selectively enabled by read selector 210 over respective leads 211 through **21*k*** for reading out the contents of the associated one of request register stages RS1 through RS*k*. The outputs of read circuits RD1 through RD*k* are connected over respective leads 161 through **16*k* and through gate 155 to lead 157. Read selector 210 is controlled by control circuit 110 over lead 113** in a manner described below.

The individual information transfer requests read out on lead 157 are ordered in queue registers 220 and 240 for processing. Initially, for example, a first group of information transfer requests from information transfer request register 150 may be ordered for processing in queue register 220. While the system is processing the first group of requests so ordered in queue register 220, a second group of transfer requests from request register 150 is ordered in queue register 240 for subsequent processing. The first transfer request in the second ordered group in queue register 240 follows immediately behind the last transfer request of the first group in queue register 220. Repeating this ordering of the information transfer request by groups thus transforms the randomly oriented transfer requests in request register 150, in effect, into an endless queue of transfer requests for processing. As will be described in detail below, the requests are shifted out of queue registers 220 and 240 through gate 290 and over lead 291 to control circuit 110 for processing.

It has been assumed in the illustrative embodiment in FIGS. 1 and 2 that access may be had to only a single memory address per sector during each memory period, that is, during each revolution of drum 131. Advantageously, therefore, each of register stages QR1 through QR*m* in queue register 220 and each of register stages QS1 through QS*m* in queue register 240 may be associated with a respective one of memory storage sectors ST1 through ST*m* of drum 131. Thus queue registers stages QR1 and QS1 are associated with memory sector ST1, stages QR2 and QS2 are associated with sector ST2, and so forth, stages QR*m* and QS*m* being associated with memory sector ST*m*. Accordingly, each information transfer request may be directed to the appropriate register stage in either queue register 220 or queue register 240, corresponding to the memory sector of drum 131 to which the transfer request is directed. This permits a reduction in the capacity requirements of the individual register stages in queue registers 220 and 240 since it is not necessary to store therein the memory sector identity portion of the memory address of the information transfer request.

The operation of the arrangement shown in FIGS. 1 and 2 will now be described. Assume that a number of information transfer requests have accumulated in transfer request register 150 and that they are continuing to be received over request lead 141 and registered in register 150. The first request received is registered in request register stage RS1, the second in stage RS2, and so forth. Queue registers 220 and 240 are assumed to be initially empty. Queue register 220 is assumed to be the queue register into which the first group of transfer requests are ordered.

Operation is initiated by control circuit 110 which directs read selector 210 via lead 113 to enable read circuit RD1. It is assumed that operation is initiated at a point when index IX is adjacent heads 132, as indicated to control circuit 110 by a suitable timing signal from clock circuit 136 over index lead 147. Read selector 210, responsive to the direction of control circuit 110, enables read circuit RD1 to read out the information transfer request registered in register stage RS1 of request register 150. The transfer request is read out nondestructively by read circuit RD1 over lead 161 through gate 155 over lead 157 to steering circuit 230. Steering circuit 230 directs the contents of the transfer request, except for the memory sector identity portion thereof, over lead 231 to gates 262 and 264. Gates 262 and 264 are disabled at this point and neither passes the request therethrough.

The memory sector identity portion of the information transfer request is directed by steering circuit 230 over lead 232 to control circuit 110 and to steering circuit 225 in queue register 220. Control circuit 110, responsive thereto, enables gate 262 to direct the transfer request on lead 231 therethrough over lead 265 to steering circuit 225 in queue register 220. Steering circuit 225 is controlled by the memory sector identity of the information transfer request, appearing on lead 232, to direct the transfer request on lead 265 over the appropriate one of leads 251 through **25*m*** to the individual queue register stage QR1 through QR*m* associated with the memory sector to which the request is directed. For example, assume that the first information transfer request registered in request register stage RS1 and read out of lead 157, in the manner described above, pertains to storage block B22 in memory sector ST2 on track TK1 of drum 131. The memory sector identity ST2 of the transfer request, appearing on lead 232, controls steering circuit 225 to direct the remainder of the transfer request over lead 252 for storage in queue register stage QR2 which, it will be recalled, is associated with memory sector ST2.

Upon storage of the first information transfer request in queue register stage QR2, that is, upon the enabling of gate 262, control circuit 110 energizes shift circuit 153 over lead 112. The output of shift circuit 153 on lead 154 shifts or pushes down the transfer requests in register 150. The first request, registered in request register stage RS1 and transferred to queue register stage QR2 in the manner just described, is thus destroyed. The request previously registered in request register stage RS2 is shifted down into request register stage RS1, the request registered in stage RS3 is shifted down into stage RS2, and so forth, each request being thus shifted down one stage. Thereupon, control circuit 110 directs read selector 210, via lead 113, to enable read circuit RD1 again to read out the contents of request register stage RS1. This time, of course, request register stage RS1 contains the second information transfer request, which was initially registered in stage RS2 of request register 150.

The memory sector identity of the transfer request, it will be recalled, is directed over lead 232 to control circuit 110. Control circuit 110 keeps track, via such memory sector identities, of the storage condition of the various queue register stages to insure that a transfer request is not directed through gates 262 and 264 to a queue register stage that is already occupied by a previously stored transfer request directed toward the same memory sector. Thus, if the next information transfer request in the illustrative example being described also pertains to memory sector ST2, such as to storage block B12 therein by way of example, control circuit 110 would not enable gate 262 to direct the transfer request to queue register 220, and control circuit 110 would not energize shift circuit 153. Rather, that transfer request would be retained in register stage RS1 of request register 150 for ordering in queue register 240 with the next group of requests and ordering of the present group would continue to the third information transfer request, which is presently registered in stage RS2 of request register 150. This is accomplished by control circuit 110 directing read selector 210 to enable read circuit RD2 to read out the contents of request register stage RS2.

Assume, however, that the second information transfer request pertains to a different memory storage sector, such as memory sector ST1 for example. Responsive to the appearance of the memory sector identity ST1 on lead 232, control circuit 110 enables gate 262 to pass the transfer request therethrough to steering circuit 225 in queue register 220. Steering circuit 225, under control of the memory sector identity on lead 232, directs the transfer request over lead 251 to queue register stage QR1 for storage, stage QR1 being associated with memory sector ST1. Control circuit 110 also energizes shift circuit 153 upon such transfer to shift the contents of transfer request register 150 down one stage again, destroying the request registered in stage RS1 (which transfer request is now registered in queue register stage QR1) and placing the third transfer request in stage RS1 of transfer request register 150.

The operation proceeds in this manner to place the random address transfer requests from request register 150 into ordered sequence in queue register 220. When a transfer request is encountered in request register 150 pertaining to a memory sector with regard to which a transfer request has already been placed in queue register 220, control circuit 110 directs read selector 210 to the next higher read circuit and thus to the next higher register stage of request register 150, retaining the subsequently received transfer request in the bottom-most register stages for ordering in the next group. For example, if during the ordering of the first group of transfer requests in queue register 220, two such transfer requests are encountered pertaining to memory sectors with regard to which a transfer request has already been placed in queue register 220, these requests will be retained in request register stages RS1 and RS2, respectively. Control circuit 110 will at this point in ordering requests in queue register 220 be directing read selector 210 to read out the transfer requests from the next higher request register stage, stage RS3 via read circuit RD3.

Similarly, shifting operation in request register 150, via shift circuit 153 under control of control circuit 110, takes place only down to request register stage RS3 after read out of each new request therefrom, the transfer requests in stages RS1 and RS2 remaining undisturbed. When ordering of a second group of transfer requests, in queue register 240, is initiated, therefore, control circuit 110 directs read selector 210 to read out the transfer request retained in request register stage RS1. Upon registration of the request in queue register 240, control circuit 110 shifts the requests down one stage in request register 150, the request from the first group which was originally retained in stage RS2 being shifted to stage RS1 for readout and transfer to queue register 240.

The ordering of information transfer requests in a queue register, such as queue register 220, is effected during one revolution of drum 131. Thus, upon receipt of the next index timing signal over lead 147, control circuit 110 proceeds to order the next group of information transfer requests in queue register 240 while the first group of transfer requests ordered in queue register 220 are processed. The information transfer requests in queue register 220 are read out for processing, one at a time, through gate 290 over lead 291 to control circuit 110. Read out of queue register 220 is effected in synchronism with the rotation of drum 131, each sector timing signal on lead 145 energizing shift circuit 275 to shift the next information transfer request out of queue register 220. The output of shift circuit 275 is directed to the proper queue register, in this case queue register 220, via one of shift gates 261 and 263 enabled by control circuit 110. Whenever a group of requests is being ordered in one of queue registers 220 and 240, the shift gate 261 or 263 associated with the other queue regitser is enabled by control circuit 110. Thus, in the present instance, shift gate 261 is enabled by control circuit 110 over lead 127 to extend the shift signals from shift circuit 275 therethrough to queue register 220.

Accordingly, at the beginning of memory sector ST1, advantageously during passage of control block BC1 thereof adjacent heads 132, shift circuit 275 shifts the first information transfer request out of stage QR1 of queue register 220 over lead 291 to control circuit 110. Responsive to the memory address portion thereof, control circuit 110 directs head selection circuit 135 over lead 115 to select the appropriate one of heads 132, illustratively head H1 in the example herein. Read circuit 137 or write circuit 138 is enabled by control circuit 110 in accordance with the read-write instruction in the information transfer request. Similarly, control circuit 110 selects the proper storage location in information buffer store 120 via lead 121, as indicated by that portion of the information transfer request. As mentioned above, timing signals for the read or write operation by control circuit 110 are derived in known manner from clock circuit 136 over lead 144.

As the beginning of memory sector ST2 passes adjacent heads 132, a memory sector timing signal on lead 145 causes shift circuit 275 to advance the next information transfer request out of queue register 220 over lead 291 to control circuit 110 for processing. The remaining transfer requests ordered in queue register 220 are read out sequentially for processing in this manner. Shortly after processing the last information transfer request in queue register 220, the transfer request pertaining to memory sector ST*m* on drum 131, index IX will again be adjacent heads 132, the resulting index timing signal on lead 147 causing control circuit 110 to disable shift gate 261 and to enable shift gate 263 via lead 128. During the ensuing memory cycle, therefore, the transfer requests ordered in queue register 240 are processed in the manner just described, while another group of transfer requests from request register 150 are ordered in queue register 220.

Figure 4:
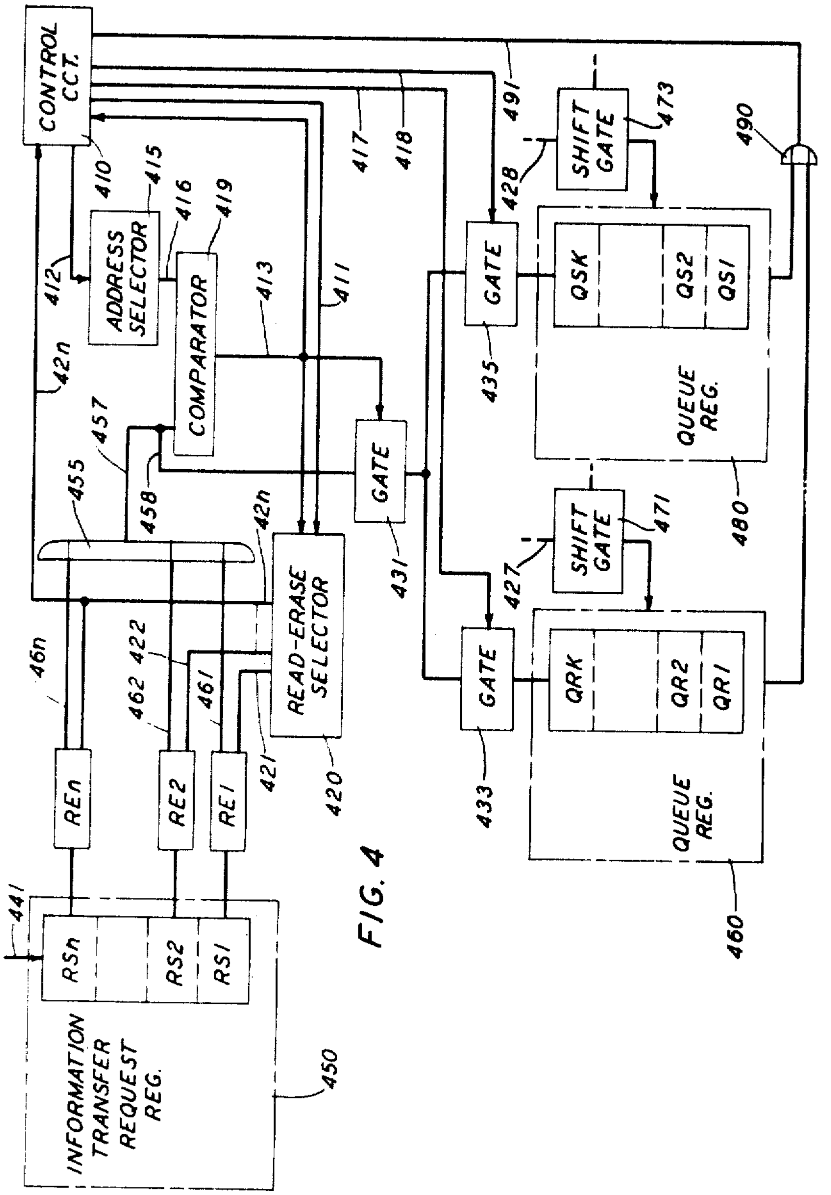
FIG. 4 depicts an alternative illustrative queue register arrangement.

In the illustrative arrangement of the invention shown in FIGS. 1 and 2, it was assumed that memory 130 was divided into memory storage sectors and that access could be had to only one storage block address in each sector during a memory cycle. Therefore, the register stages in queue registers 220 and 240 were each associated advantageously with a respective memory storage sector and steering circuitry in the two registers steered each information transfer request from request register 150 into the appropriate queue register stage. However, in some sequential access memory systems, access may be had to each consecutive storage address in the memory. It may be appreciated readily that if such were the case it would not be practical, generally, to provide an individual register stage in each queue register associated with each memory address. Rather, each queue register would be provided with a plurality of register stages depending upon the number of accesses to the memory desired during a memory cycle, that is, depending upon the desired information transfer rate. An illustrative embodiment of an arrangement for effecting the ordering of random address information transfer requests in such a system is shown in FIG. 4. For the purposes of clarity and to facilitate description, the sequential access memory, the information buffer store, and the input and output circuitry are not shown in FIG. 4, it being assumed that these portions of the sequential access memory system are substantially similar to that shown in the embodiment of FIGS. 1 and 2, with the above-mentioned exception that access may be had to each consecutive address in the sequential access memory employed with the arrangement in FIG. 4.

In the arrangement in FIG. 4, information transfer requests are received on lead 441 from an input circuit similar to input circuit 140 in FIG. 1 and registered in stages RS1 through RS*n* of information transfer request register 450 in a manner substantially similar to that described above for request register 150. However, inasmuch as queue register stages QR1 through QR*k* and QS1 through QS*k* have no relationship with particular portions of the sequential access memory, the ordering of the transfer requests in queue registers 460 and 480 is handled in a considerably different manner than in the arrangement of FIGS. 1 and 2. Each of request register stages RS1 through RS*n* have associated therewith individual read-erase circuits RE1 through RE*n*. Read-erase selector 420 enables each of read-erase circuits RE1 through RE*n* in sequence to scan the contents of the associated request register stages RS1 through RS*n*. The contents of stages RS1 through RS*n* are thus read out nondestructively in sequence over respective leads 461 through **46*n*, through gate 455 and over lead 457 to comparator 419**.

Comparator 419 compares the sequential access memory address portion of each information transfer request appearing on lead 457 with a memory address provided by address selector 415 on lead 416. Control circuit 410 via lead 412 controls address selector 415 to provide consecutive memory addresses on lead 416 in the same serial manner as the addresses appearing in a memory cycle. This arrangement, therefore, permits the scanning of the information transfer requests in request register 150 in search of a request directed to the first address in the memory cycle, then for the second address, etc., through all of the memory addresses.

For example, let it be assumed that the sequential memory addresses in the memory cycle, that is within a track of the memory, are numbered consecutively from 1 to 1,000 and that a track address and a memory address identify a particular memory storage location. Control circuit 410 initially directs address selector 415 to provide memory address 1 on lead 416 to comparator 419; and read-erase selector 420 is enabled via lead 411 to initiate a scanning cycle through the contents of transfer request register 450 for a transfer request directed toward memory address 1. Read-erase selector 420, responsive to the enabling signal on lead 411, selectively enables read-erase circuits RE1 through RE*n* in sequence to read out nondestructively the contents of request register stages RS1 through RS*n*, one at a time, over lead 457 to comparator 419. If a transfer request appears on lead 457 which is directed toward memory address 1, comparator 419 provides a suitable comparison signal on lead 413.

The comparison signal on lead 413 is directed to control circuit 410, to gate 431 and to read-erase selector 420. It will be noted that each transfer request appearing on lead 457 is also directed over lead 458 to gate 431. Gate 431 is enabled by a comparison signal on lead 413 to extend the transfer request on lead 458 therethrough to queue register gates 433 and 435. Thus in the example described, the appearance of a transfer request on lead 458 which is directed to memory address 1 is detected by comparator 419, which generates a comparison signal on lead 413, enabling gate 431 to extend the transfer request therethrough to queue register gates 433 and 435. One of gates 433 and 435 is enabled by control circuit 410, such as gate 433 over lead 417. The transfer request is thus directed through enabled gate 433 to queue register 460 for storage in the bottom-most vacant stage thereof, stage QR1 in this instance.

Control circuit 410 is responsive to the comparison signal on lead 413 to direct address selector 415 to provide the next consecutive memory address on lead 416, that is, memory address 2. Read-erase selector 420 is responsive to the comparison signal on lead 413 to erase the contents of the request register stage whose contents were just transferred to queue register 460 in the manner described above and to initiate a new scanning cycle. For example, if during the first scanning cycle an information transfer request directed toward memory address 1 is found in request register stage RS2, read-erase selector 420 is responsive to the comparison signal on lead 413 to halt the advance of the scanning cycle at register stage RS2, to erase the contents of stage RS2 via read-erase circiut RE2, and then to initiate a new scanning cycle starting again with register stage RS1 looking now for a tranfer request directed toward memory address 2. Upon the contents of one of the request register stages being erased, such as the contents of stage RS2 in the illustrative example, the contents of the register stages above that stage are pushed down one stage prior to initiation of the next scanning cycle.

If during a scanning cycle no transfer request is found in request register 450 which is directed toward the memory address provided by address selector 415 on lead 416, address selector 415 is advanced to the next memory address and a new scanning cycle is initiated. Control circuit 410 is advised that a scanning cycle is complete by the enablement of the last read-erase circuit RE*n*, this indication being provided by the enabling signal from read-erase selector 420 on lead **42*n* to control circuit 410. Responsive thereto, in the absence of a comparison signal of lead 413** resulting from readout of stage RS*n*, control circuit 410 advances address selector 415 to the next memory address via lead 412 and directs read-erase selector 420 via lead 411 to initiate a new scanning cycle.

Accordingly, it will be appreciated that the contents of queue register stages QR1 through QR*k* will, via the successive scanning and read out of the contents of transfer request register 450 in the above manner, comprise information transfer requests ordered in the serial manner in which memory addresses occur in the sequential access memory. The ordering of transfer requests in an individual one of queue registers 460 and 480 is effected during a single memory cycle, whereupon during the next memory cycle the requests so ordered are processed while another group of transfer requests are being ordered in the other queue register. Processing of the transfer requests in one of queue registers 460 and 480 is effected in the same manner as that described above in connection with the embodiment of FIGS. 1 and 2, the requests being read out through gate 490 over lead 491 to control circuit 410. Read out is synchronized to the sequential access memory via shift pulses generated by a shift circuit (not shown) in synchronism with memory address timing signals from the sequential access memory. The shift pulses are directed to the appropriate one of queue registers 460 and 480 through one of shift gates 471 and 473 enabled by control circuit 410 over a respective one of leads 427 and 428.

If a queue register is filled with transfer requests before the end of a memory cycle, as will generally be the case, control circuit 410 terminates further scanning of request register 450 until the beginning of the next memory cycle, during which time requests will be ordered in the other queue register. Control circuit 410 keeps track of the loading of the queue registers via the comparison signals on lead 413 from comparator 419. Initiation of the next scanning cycle by control circuit 410 to load the other queue register begins at the memory address following that for which the last comparison signal was received on lead 413. Of course, if desired for a particular application, address selector may be reset by control circuit 110 to initiate the new scanning cycle with memory address 1.

It will be appreciated that queue registers 460 and 480 may be associated with predetermined memory address groups and that control circuit 410 may direct address selector 415 to provide the appropriate memory addresses on lead 416 during a scanning cycle in accordance with the particular queue register being loaded. Thus, for example, in memory systems employing interleaved words for adjacent memory addresses, one queue register may be associated advantageously with the even-numbered memory addresses and the other register with the odd-numbered memory addresses. The transfer requests in request register 450 may be scanned alternately for ordering even-numbered memory address requests in one queue register and for ordering odd-numbered memory address requests in the other queue register. The even-numbered address requests may be processed during one memory period and the odd-numbered address requests during the next memory period.

Figure 5:
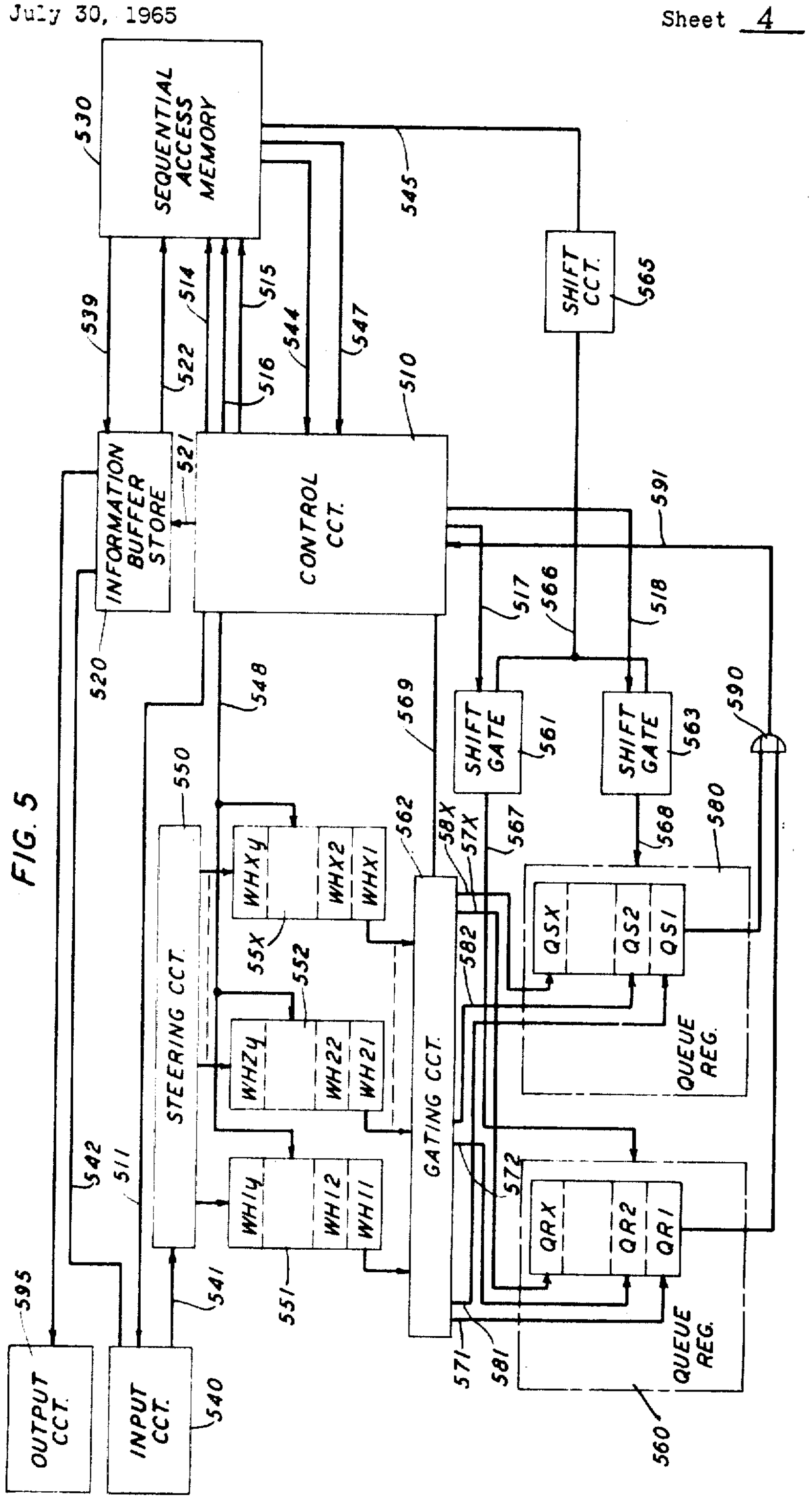
FIG. 5 is a block diagram of another alternative illustrative embodiment of a transfer request queueing arrangement for a sequential access memory system in accordance with the principles of the present invention.

In the alternative illustrative embodiment shown in FIG. 5, circuitry is provided for ordering the individual random address information transfer requests as they are received by the sequential access memory system. Let it again be assumed, as was the case with the embodiment in FIGS. 1 and 2, that a memory period of sequential access memory 530 is divided into a plurality of consecutively numbered memory sectors, such as sectors 1 through *x*, and that each sector can be accessed only at a single address during each memory cycle. A plurality of information transfer request registers 551 through **55*x* are thus provided in FIG. 5, each register being respectively associated with a corresponding one of the memory sectors. For example, transfer request register 551 may be associated with memory sector 1, register 552 with memory sector 2, and so forth, register 55*x*** being associated with memory sector *x*. Each of transfer request registers 551 through **55*x*** is provided with a plurality *y* of stages individually capable of registering a single information transfer request directed toward the particular memory sector with which the request register is associated.

The bottom stages WH11 through WH*x*1 of request registers 551 through **55*x* are each connected through gating circuit 562 to a corresponding register stage in queue register 560 and to a corresponding register stage in queue register 580, which queue register stages are therefore individually associated with respective ones of the memory sectors of sequential access memory 530. Thus, for example, request register stage WH11 is connected through gating circuit 562 over lead 571 to queue register stage QR1 of queue register 560 and over lead 581 to queue register stage QS1 of queue register 580, queue register stages QR1 and QS1 being associated therefore with memory sector 1. Similarly, request register stage WH21 is connected through gating circuit 562 over leads 572 and 582 to queue register stages QR2 and QS2, respectively, which stages are thus associated with memory sector 2; and request register stage WX1 is connected over leads 57*x* and 58*x***, respectively, to queue register stages QR*x* and QS*x* associated with memory sector *x*.

Accordingly, each information transfer request received on request lead 541 is steered by steering circuit 550 into the bottommost vacant stage of the appropriate one of information transfer request registers 551 through **55*x* in accordance with the memory sector identity portion of the request. If, by way of example, the first transfer request received on lead 541 is directed toward memory sector 2 of sequential access memory 530, steering circuit 550 steers the request into transfer request register 552, the request being registered in stage WH21 thereof. If the next transfer request on lead 541 is also directed toward memory sector 2, it is steered into request register stage WH22 of request register 552**. If, on the other hand, the next transfer request is directed toward a different memory sector, such as memory sector *x*, it is steered by steering circuit 550 into the bottommost vacant stage of the request register associated with that sector, stage WH*x*1 of transfer request register **55*x***.

Once during each memory period of sequential access memory 530, such as responsive to the appearance of an index timing signal on lead 547 from memory 530, control circuit 510 enables gating circuit 562 via lead 569 to transfer the contents of transfer request register stages WH11 through WH*x*1 into one of queue registers 560 and 580 for processing. Assuming that the transfer requests are to be placed into queue register 560 for example, control circuit 510 enables gating circuit 562 to transfer the contents of request register stages WH11 through WH*x*1 over leads 571 through **57*x*** into respective queue register stages QR1 through QR*x* of queue register 560.

Read out of the transfer requests from queue register 560 for processing is effected in a manner substantially similar to that described above in connection with the embodiment of FIGS. 1 and 2. Shift circuit 565 provides shift pulses on lead 566 through shift gate 561, enabled by control circuit 510 via lead 517, over lead 567 to queue register 560. The shift pulses are properly synchronized to the operating speed of sequential access memory 530 by appropriate timing signals provided to shift circuit 565 over lead 545 from memory 530. The individual transfer requests read out of queue register 560 are directed through gate 590 over lead 591 to control circuit 510 for processing in the manner described above.

Incident to the transfer of the contents of transfer request register stages WH11 through WH$x$1 to queue register 560, the remaining contents of each of transfer request registers 551 through 55$x$ are pushed down one stage by control circuit 510 via lead 568. Thus, the transfer requests registered in stages WH12 through WH$x$2 are advanced into respective stages WH11 through WH$x$1. Therefore, during the read out and processing of the transfer requests from queue register 560, the next group of transfer requests, those now registered in transfer request stages WH11 through WH$x$1, are transferred through gating circuit 562 over leads 581 through 58$x$ into respective queue register stages QS1 through QS$x$ of queue register 580. Accordingly, well prior to the completion of the processing of the transfer request from queue register 560, the next group of transfer requests to be processed are registered in queue register 580 for subsequent processing. Read out of queue register 580 is controlled, of course, by control circuit 510 enabling shift gate 563 via lead 518 and disabling shift gate 561.

The arrangement depicted in FIG. 5 is particularly advantageous in sequential access memory systems wherein the information to be stored in memory 530 is assigned to a particular memory storage location by the memory system, rather than it being preassigned. In such memory systems, reference by control circuit 510 to the plurality of information transfer request registers 551 through 55$x$ readily shows which memory storage sectors have the least backlog of transfer requests. This permits control circuit 510 to make a better distribution of the workload by assigning the new transfer requests to locations in those sectors whenever possible.

In each of the illustrative embodiments described above, it has been assumed the individual transfer request queues correspond to, and are processed during, a single memory period of the sequential access memory. In general, however, it will be appreciated that the queues need not correspond to a memory period, although such correspondence is usually desirable. The queues may correspond, for example, to a multiple or submultiple of the memory period, the size of the queues varying accordingly to provide a given information transfer rate.

It is to be understood that the above-described arrangements are merely illustrative of the present invention. Numerous other arrangements may be devised by those skilled in the art without departing from the spirit and scope of the invention.

What is claimed is:

1. In a sequential access memory system the combination for increasing the information transfer rate of said memory system comprising, means for receiving information transfer requests, means for registering said requests in the consecutive order in which they are received, a plurality of queue registers for registering groups of said information transfer requests, means for reading said requests individually from said registering means and for placing said individual requests in selected areas of said plurality of queue registers in ordered sequences, said ordered sequences corresponding to the order of sequential access to said memory system, and means for transferring information to and from said memory system in accordance with the information transfer requests registered in a selected one of said plurality of queue registers.

2. In a sequential access memory system the combination for increasing the information transfer rate of said memory system comprising, means for receiving and registering individual random address information transfer requests in the consecutive order received, means for ordering said individual random address information transfer requests by groups in the serial manner in which access to the addresses in said sequential access memory system occurs, and means for processing each of said ordered groups of information transfer requests in turn during respective periods of said memory system.

3. In a sequential access memory system the combination in accordance with claim 2 wherein said processing means is operative to process an ordered group of said information transfer requests concurrently with the operation of said ordering means in ordering another group of information transfer requests.

4. In a sequential access memory system the combination in accordance with claim 3 wherein said ordering means comprises at least a first and a second queue register each having a plurality of register stages individually capable of registering a single information transfer request and wherein said processing means comprises means for selectively reading out information transfer requests from said register stages of one of said first and second queue registers in a selected register stage sequence.

5. In a sequential access memory system the combination in accordance with claim 4 wherein said queue register stages are individually associated with predetermined distinct address portions of said sequential access memory system and wherein said ordering means further comprises means for steering each information transfer request into the respective one of said register stages associated with the address portion of said sequential access memory system to which said information transfer request is directed.

6. In a sequential access memory system the combination in accordance with claim 5 further comprising, means responsive to the registration of an information transfer request in a register stage of one of said first and second queue registers for preventing the registration of a subsequent information transfer request in said register stage until all of the information transfer requests in said one queue register are processed.

7. In a sequential access memory system the combination for increasing the information transfer rate of said memory system comprising, means for receiving and registering individual random address information transfer requests as they are received, means for ordering a first plurality of said registered information transfer requests in the serial sequence in which access to addresses in said memory system occurs, means for processing individual ones of said first plurality of information transfer requests in said ordered sequence, means for ordering a second plurality of said registered transfer requests in said serial sequence during said processing of said first plurality of transfer requests, and means including said processing means for processing said second plurality of transfer requests in the sequence ordered upon completion of processing of said first plurality of transfer requests.

8. In a sequential access memory system the combination for increasing the information transfer rate of said memory system comprising, means for registering individual random address information transfer requests as they are received, control means, means including said control means for ordering a first group of said registered information transfer requests in an address sequence having a predetermined relationship with the organization of addresses in said sequential access memory system, processing means, means including said control mean and said processing means for processing said first group of information transfer requests in the address sequence ordered and concurrently for ordering a second group of said registered information transfer requests in an address sequence having a predetermined relationship with the organization of addresses in said sequential access memory system, and means including said processing means for processing said second group of information transfer requests in the address sequence ordered upon completion of processing of said first group of information transfer requests.

9. In a sequential access memory system the combination in accordance with claim 8 wherein said ordering means further comprises, means for ordering said first and second groups such that the first information transfer request in the subsequently ordered one of the first and second groups follows the last information transfer request in the preceding ordered one of said groups in the same serial manner as said address organization of said sequential access memory system.

10. In a sequential access memory system the combination for increasing the information transfer rate of said memory system comprising, means for registering said transfer requests initially in the consecutive order in which said requests are received, means operable for ordering pluralities of said registered transfer requests in the serial manner in which access to addresses occurs in said sequential access memory system, means operable for selectively processing individual ones of said pluralities of information transfer requests in the sequence ordered, and control means for operating said operating means to order a plurality of said registered information transfer requests and concurrently for operating said processing means to process a previously ordered plurality of information transfer requests.

References Cited

UNITED STATES PATENTS 3,328,787 6/1967 Reichert --------- 340—174.1

GARETH D. SHAW, *Primary Examiner.*